US012601288B2

(12) United States Patent
S. et al.

(10) Patent No.: US 12,601,288 B2
(45) Date of Patent: Apr. 14, 2026

(54) ACTIVE COOLANT MONITORING AND LEAK MITIGATION IN VEHICLE COOLING SYSTEMS

(71) Applicant: Volvo Truck Corporation, Gothenburg (SE)

(72) Inventors: Manoj Kumar S., Bangalore (IN); Mahesh Jaypal Kumbhar, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/843,125

(22) PCT Filed: May 17, 2022

(86) PCT No.: PCT/IB2022/054587
§ 371 (c)(1),
(2) Date: Aug. 30, 2024

(87) PCT Pub. No.: WO2023/223074
PCT Pub. Date: Nov. 23, 2023

(65) Prior Publication Data

US 2025/0172088 A1 May 29, 2025

(51) Int. Cl.
*F01P 11/14* (2006.01)
*F01P 7/14* (2006.01)
(Continued)

(52) U.S. Cl.
CPC ................. *F01P 11/14* (2013.01); *F01P 7/14* (2013.01); *F01P 11/029* (2013.01); *G07C 5/0825* (2013.01); *F01P 2007/146* (2013.01)

(58) Field of Classification Search
CPC .. F01P 11/14; F01P 7/14; F01P 11/029; F01P 2007/146; G07C 5/0825
See application file for complete search history.

(56) References Cited

U.S. PATENT DOCUMENTS 4,632,069 A * 12/1986 Aoki ........................ F01P 7/167 123/41.15
5,521,581 A * 5/1996 Proulx .................. G01F 23/242 123/41.14
(Continued)

FOREIGN PATENT DOCUMENTS

CN 102998063 A 3/2013
CN 106979062 A 7/2017
(Continued)

OTHER PUBLICATIONS

International Search Report and Written Opinion of the International Searching Authority, PCT/IB2022/054587, mailed Mar. 20, 2023, 19 pages.

*Primary Examiner* — Hung Q Nguyen
(74) *Attorney, Agent, or Firm* — Sage Patent Group

(57) ABSTRACT

A vehicle cooling system includes a heat exchanger, upper and lower coolant hoses extending between the heat exchanger and a vehicle power system for carrying liquid coolant to and from the vehicle power system, and an expansion tank fluidly coupled to the lower coolant hose. The vehicle cooling system further includes an active coolant monitoring system that includes a coolant leak sensor that detects leakage of the liquid coolant from the vehicle cooling system and a coolant contamination sensor that detects contamination of the of liquid coolant. The vehicle cooling system further includes an electronically controllable coolant flow shutoff valve in series with the lower coolant hose adjacent a lower coolant outlet of the heat exchanger. The electronically controllable coolant flow shutoff valve is closed when the coolant pump is off and open when the coolant pump is on.

20 Claims, 8 Drawing Sheets

(51) Int. Cl.
*F01P 11/02* (2006.01)
*G07C 5/08* (2006.01)

(56) References Cited

U.S. PATENT DOCUMENTS

| | | | | |
|---|---|---|---|---|
| 6,105,932 | A | 8/2000 | Crook | |
| 9,222,840 | B1 * | 12/2015 | Shammoh | F01P 11/16 |
| 2017/0122876 | A1 | 5/2017 | Petty | |
| 2017/0335751 | A1 * | 11/2017 | Newman | G01F 23/247 |
| 2019/0086338 | A1 | 3/2019 | Bailey | |
| 2021/0181055 | A1 | 6/2021 | Acar | |
| 2023/0193809 | A1 * | 6/2023 | Chandrasekaran | F01P 11/18 123/41.15 |

FOREIGN PATENT DOCUMENTS

| | | | | |
|---|---|---|---|---|
| DE | 102004005215 | A1 | 8/2005 | |
| DE | 202013100229 | U1 * | 2/2013 | B60H 1/00364 |
| DE | 102015220095 | B3 * | 2/2017 | H01M 10/613 |
| EP | 1167713 | A2 * | 1/2002 | B60H 1/00499 |
| EP | 3293380 | A1 | 3/2018 | |
| EP | 3922824 | A1 * | 12/2021 | G01F 1/002 |
| GB | 2387892 | A | 10/2003 | |
| JP | 2004232501 | A * | 8/2004 | |
| JP | 2018040738 | A | 3/2018 | |
| KR | 20040042383 | A | 5/2004 | |
| KR | 100482429 | B1 * | 4/2005 | F01P 11/14 |
| KR | 101105266 | B1 | 1/2012 | |
| WO | WO-9505532 | A2 * | 2/1995 | F01P 11/14 |
| WO | WO-0225291 | A2 * | 3/2002 | B62D 15/025 |
| WO | 2018156093 | A1 | 8/2018 | |
| WO | 2021252831 | A1 | 12/2021 | |

* cited by examiner

ACTIVE COOLANT MONITORING AND LEAK MITIGATION IN VEHICLE COOLING SYSTEMS

CROSS REFERENCE TO RELATED APPLICATIONS

This application is a 35 U.S.C. § 371 national stage application of PCT International Application No. PCT/IB2022/054587 filed on May 17, 2022, the disclosure and content of which is incorporated by reference herein in its entirety.

TECHNICAL FIELD

The disclosure relates generally to coolant systems for vehicles. In particular aspects, the disclosure relates to active coolant monitoring systems and methods for vehicles.

The disclosure can be applied in heavy-duty vehicles, such as trucks, buses, and construction equipment. Although the invention will be described with respect to a particular vehicle, the invention is not restricted to any particular vehicle.

BACKGROUND

A motor vehicle engine includes a cooling circuit that regulates the temperature of the engine. The coolant circuit contains a liquid coolant that absorbs heat generated by the engine. The cooling circuit carries the liquid coolant to a radiator that removes the heat carried by the coolant by dissipating the heat energy to ambient air. The radiator exchanges heat with an ambient air flow at a rate that is dependent on the speed of the vehicle and/or on whether or not a motor fan is running. A pump is also provided in the cooling circuit for pumping coolant through the cooling circuit. The pump may adjust the rate of flow of liquid coolant through the cooling circuit as needed based on engine or coolant temperature. A thermostat is also provided in the main circuit to monitor the coolant temperature.

Cooling circuits are used to cool internal combustion engines as well as other types of motors, such as fuel cell systems. Internal combustion engines generate significant heat from the combustion process. If not properly managed, heat energy generated by combustion can damage components of the engine and render it inoperable. Thermal management is also a significant requirement for fuel cell electric vehicles, as liquid coolant is used to cool the fuel cell stack.

Coolant leaks present a significant problem for systems that use liquid cooling circuits, because it may cause engine overheating due to loss of cooling efficiency. Coolant leaks can also cause the liquid coolant to become contaminated, as the leak may allow external contaminants into the cooling circuit.

Coolant leaks can occur in many different areas of a cooling circuit, including on the retarder hose, on a lower radiator hose due to chafing against a charge air cooling pipe, at the hose connecting to the expansion tank, and other areas. The cause of a coolant leakage is often difficult to identify, and even identifying the location of a coolant leak can be difficult and time consuming.

Liquid coolant in a vehicle cooling system can become contaminated with many different types of contaminants as a result of the liquid coolant passing through a vehicle engine, such as grease, oil, iron particles, aluminum particles, steel particles, rubber particles, EPDM particles, plastic particles, silicon particles, etc. These contaminants can cause corrosion of various parts of a vehicle cooling system, which can result in leaks in the system. Coolant contamination can also cause the efficiency of the cooling system to become impaired, as contaminations may cause the liquid coolant not to conduct heat as efficiently.

It is therefore desirable to monitor both the coolant level and contamination in the coolant system. Typically, manual inspection is used to measure coolant level and look for evidence of leakage, particularly near hoses, couplings, etc. In addition, some passive coolant leak detection techniques have been implemented, such as thermal laser scanning, ultrasonic laser scanning and pressure monitoring.

In thermal laser scanning, leaks are detected by scanning the area with a laser thermal scanning tool which indicates leaks based on changes in a thermal image. In ultrasonic scanning, leaks are detected by performing ultrasonic scanning on the area of a suspected leak.

Pressure drop detection is performed by pressurizing the cooling system with an external pump and measuring a drop in the pressure after pumping. The amount of pressure drop may indicate the severity of the leak.

All these techniques are passive and must be performed while the vehicle is stopped in a garage.

SUMMARY

To maintain the efficiency and/or operability of a vehicle cooling system, it is desirable to monitor the quality of the liquid coolant in the system and to identify any coolant leaks or contamination as quickly as possible, preferably during operation of the vehicle in which the coolant system is installed. Some aspects provide an active coolant monitoring system that includes one or more leak sensors, one or more color sensors, and/or one or more pH sensors that monitor the liquid coolant system during operation. The system can provide information directly to the operator of the vehicle during operation in the event a problem with the liquid coolant is detected.

An additional problem that can arise is that when a coolant pump that pumps liquid coolant through the cooling system is shut off, liquid coolant can pool in a lower coolant hose that carries liquid coolant from a heat exchanger to the vehicle power system. Since the lower coolant hose can remain pressurized when the vehicle is not operating, leaks can develop in and around the lower coolant hose. Accordingly, some further aspects provide an electronically controllable valve that shuts off a flow of coolant from the heat exchanger to the lower coolant hose to depressurize the lower coolant hose and thereby reduce or inhibit leaks when the coolant pump is turned off.

According to an aspect of the disclosure, a vehicle cooling system includes a heat exchanger, upper and lower coolant hoses extending between the heat exchanger and a vehicle power system for carrying liquid coolant to and from the vehicle power system, and an expansion tank fluidly coupled to the lower coolant hose. The vehicle cooling system further includes an active coolant monitoring system. The active coolant monitoring system includes a coolant leak sensor that detects leakage of the liquid coolant from the vehicle cooling system and a coolant contamination sensor that detects contamination of the of liquid coolant, wherein each of the coolant contamination sensor and the coolant leak sensor is disposed at the lower coolant hose and/or the expansion tank.

In an example, the vehicle cooling system further includes an electronic control unit (ECU) configured to receive a sensor signal generated by the coolant contamination sensor and/or the coolant leak sensor and to generate a notification signal in response to the sensor signal. The notification signal may include a dashboard signal on a dashboard of a vehicle in which the vehicle cooling system is provided. In an example, the ECU transmits the notification signal to a remote storage system.

In an example, the vehicle cooling system further includes a wireless transmitter configured to receive the sensor signal from the coolant color sensor and/or the coolant leak sensor and to transmit the sensor signal to the ECU.

In an example, the vehicle cooling system further includes a hose clamp on the lower coolant hose, wherein the coolant color sensor and/or the coolant leak sensor is integrated into the hose clamp.

In an example, the coolant contamination sensor includes a pH sensor for detecting a pH level of the liquid coolant. The pH sensor may be a solid state electronic pH sensor.

In an example, the coolant leak sensor includes a light emitting diode that generates an optical signal toward a pH-sensitive surface that changes reflectivity relative to the optical signal in response to detecting a change in pH, and a photodiode that is configured to detect a reflection of the optical signal from the pH-sensitive surface and to generate a sensor signal in response to detecting the reflection of the optical signal from the pH-sensitive surface.

In an example, the coolant contamination sensor includes a color sensor that senses a color of the liquid coolant and generates a signal indicative of the color of the liquid coolant.

In an example, the vehicle cooling system further includes a coolant pump attached to the upper coolant hose, and an electronically controllable coolant flow shutoff valve in series with the lower coolant hose adjacent a lower coolant outlet of the heat exchanger. The electronically controllable coolant flow shutoff valve is configured to be closed when the coolant pump is off and open when the coolant pump is on.

In an example, an electrical control line is between the coolant pump and the electronically controllable coolant flow shutoff valve and configured to carry a control signal from the coolant pump to the electronically controllable coolant flow shutoff valve indicative of an operational state of the coolant pump.

In an example, the electronically controllable coolant flow shutoff valve is configured to inhibit liquid coolant from pressurizing the lower coolant hose when the pump is off.

According to a further aspect of the disclosure, a vehicle cooling system includes a heat exchanger, upper and lower coolant hoses extending between the heat exchanger and a vehicle power system for carrying liquid coolant to and from the vehicle power system, and a coolant pump attached to the upper coolant hose. The vehicle cooling system further includes an electronically controllable coolant flow shutoff valve in series with the lower coolant hose adjacent a lower coolant outlet of the heat exchanger. The electronically controllable coolant flow shutoff valve is configured to be closed when the coolant pump is off and open when the coolant pump is on.

In an example, the vehicle cooling system further includes an electrical control line between the coolant pump and the electronically controllable coolant flow shutoff valve and configured to carry a control signal from the coolant pump to the electronically controllable coolant flow shutoff valve indicative of an operational state of the coolant pump.

In an example, the electronically controllable coolant flow shutoff valve is configured to inhibit liquid coolant from collecting in the lower coolant hose when the pump is off.

In an example, the vehicle cooling system further includes an active coolant monitoring system including a coolant leak sensor that detects leakage of the liquid coolant from the vehicle cooling system and a coolant contamination sensor that detects contamination of the liquid coolant. Each of the coolant color sensor and the coolant leak sensor is disposed at the lower coolant hose and/or the expansion tank.

In an example, the vehicle cooling system further includes an electronic control unit (ECU) configured to receive a sensor signal generated by the coolant contamination sensor and/or the coolant leak sensor and to generate a notification signal in response to the sensor signal.

In an example, the vehicle cooling system further includes a wireless transmitter configured to receive the sensor signal from the coolant contamination sensor and/or the coolant leak sensor and to transmit the sensor signal to the ECU.

In an example, the vehicle cooling system further includes a hose clamp on the lower coolant hose, wherein the coolant contamination sensor and/or the coolant leak sensor is integrated into the hose clamp.

According to a further aspect of the disclosure, a method of operating a vehicle cooling system for a vehicle is provided, the vehicle cooling system including a heat exchanger, upper and lower coolant hoses extending between the heat exchanger and a vehicle power system for carrying liquid coolant to and from the vehicle power system, an expansion tank fluidly coupled to the lower coolant hose, and an active coolant monitoring system comprising a coolant leak sensor that detects leakage of the liquid coolant from the vehicle cooling system and a coolant contamination sensor that detects contamination of the liquid coolant, wherein the coolant leak sensor and/or the coolant contamination sensor is disposed at the lower coolant hose or the expansion tank. The method includes during operation of the vehicle, determining whether the liquid coolant is contaminated based on a first signal from the coolant contamination sensor, and generating a first alert (42A) in response to detecting contamination of the liquid coolant, and determining whether there is a leak in vehicle cooling system based on a second sensor signal from the coolant leak sensor, and generating a second alert (42B) in response to detecting the leak in the vehicle cooling system. Additional features and advantages are disclosed in the following description, claims, and drawings, and in part will be readily apparent therefrom to those skilled in the art or recognized by practicing the embodiments as described herein.

BRIEF DESCRIPTION OF THE DRAWINGS

With reference to the appended drawings, below follows a more detailed description of embodiments of the invention cited as examples.

DETAILED DESCRIPTION

Figure 1:
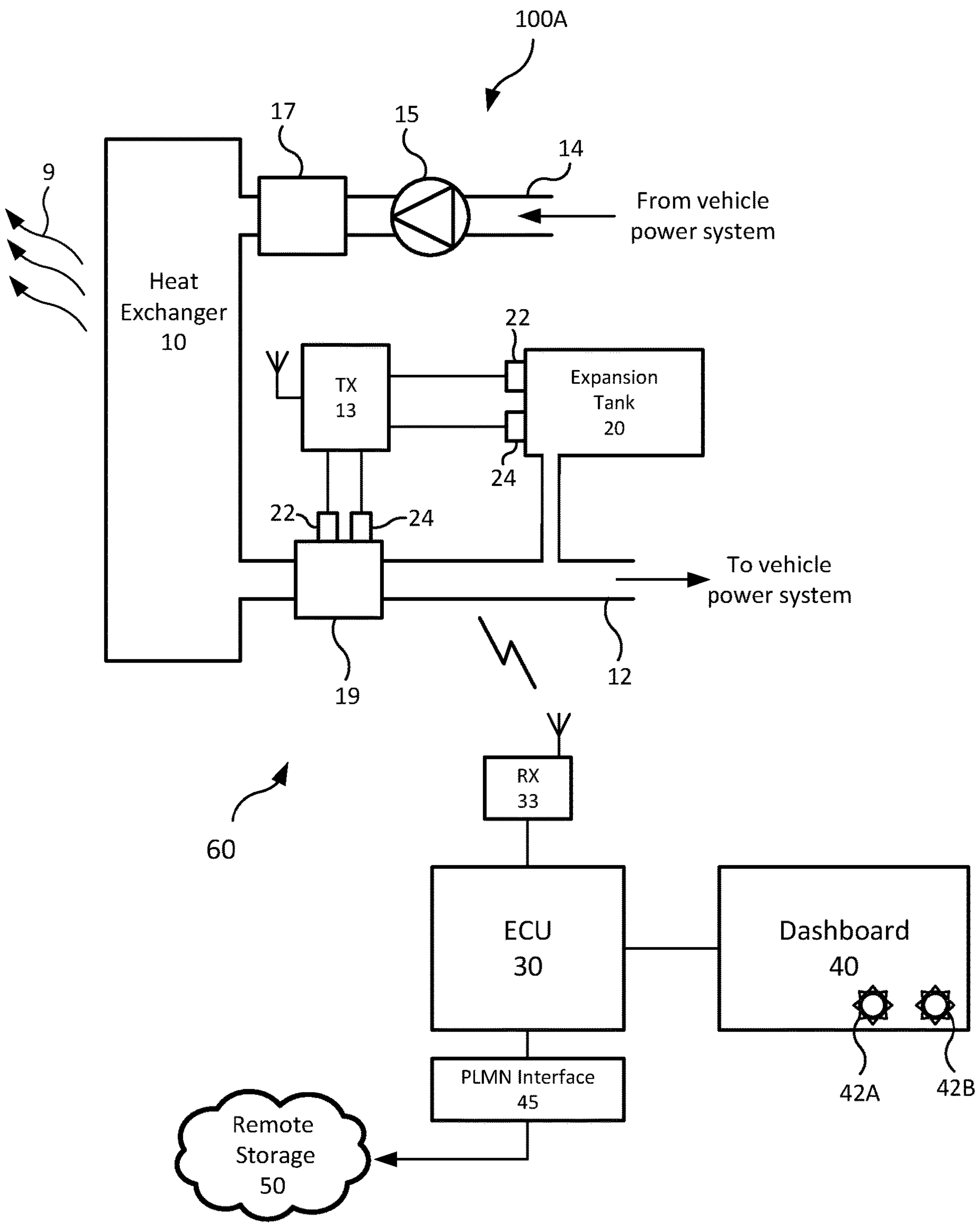
FIG. 1 is a vehicle cooling system including an active coolant monitoring system according to one example.

The embodiments set forth below represent the necessary information to enable those skilled in the art to practice the embodiments and illustrate the best mode of practicing the embodiments.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

As noted above, passive coolant leak detection involves scanning or inspecting a coolant system for evidence of leaks, or detecting pressure drops in a cooling system. However, such passive systems are not capable of detecting a coolant leak in an operating vehicle. Accordingly, some aspects described herein provide active coolant leak monitoring systems and/or methods that may be able to more detect a coolant leak while a vehicle is operating. Moreover, active leak monitoring systems and/or methods as described herein may be capable of detecting an exact location of a coolant leak and/or notify the vehicle operator and/or owner of a detected leak. Some further embodiments provide active leak avoidance systems that shut off pressure to lower components (where leaks are most likely to occur) when the coolant pump is in an OFF condition to reduce the occurrence of leaks.

In particular, some embodiments provide a vehicle cooling system having upper and lower coolant hoses each extending between an engine and a heat exchanger. The system includes an active coolant monitor having a color sensor and a physical pH sensor disposed at a hose clamp and/or an expansion tank.

The cooling system includes a valve between the heat exchanger and the lower coolant hose, the valve being closed when a coolant pump is off and open when the coolant pump is on. When the coolant pump is off, the closed valve prevents coolant from collecting in the lower coolant hose due to gravity. Allowing hot coolant to pool in this area when the vehicle is turned off, for example, may contribute to leaks at the hose clamps in this area because the temperature changes that occur as the coolant cools produces pressure fluctuations in the lower coolant hose.

FIG. 1 is a simplified schematic diagram of a vehicle cooling system 100A according to one example. The vehicle cooling system 100A is shown as an example of a system in which embodiments may be employed, but it will be appreciated that the vehicle cooling system 100A can have many different configurations, and that embodiments described herein can be advantageously employed in many different types of vehicle cooling systems.

The vehicle cooling system 100A includes a heat exchanger 10 that receives a liquid coolant from a vehicle power system via an upper coolant hose 14. In particular, a pump 15 connected in series with the upper coolant hose 14 pumps the liquid coolant from the vehicle power system through the upper coolant hose 14 and into the heat exchanger 10. The upper coolant hose 14 is coupled to the heat exchanger 10 via an upper hose coupling clamp 17.

The liquid coolant received via the upper coolant hose 14 is elevated in temperature as a result of absorbing heat energy from the vehicle power system, which may be, for example, an internal combustion engine, an electric motor, a fuel cell, etc. The heat exchanger 10 operates to dissipate heat 9 from the liquid coolant to an ambient environment. Thus, the liquid coolant is cooled as it passes through the heat exchanger 10, and lower temperature liquid coolant is supplied back to the vehicle power system through a lower coolant hose 12 that is coupled to the heat exchanger 10 via a lower hose coupling clamp 19.

An expansion tank 20 is fluidly coupled to the lower coolant hose 12. During vehicle operation, the liquid coolant heats up and expands. The expansion tank 20 acts as a reservoir for the liquid coolant to expand into during vehicle operation.

It will be appreciated that FIG. 1 illustrates one example of many coolant systems in which the inventive concepts may be advantageously employed, and that other arrangements for the cooling system are possible. For example, the pump 15 and/or the expansion tank 20 could be located at different parts of the vehicle cooling system 100A.

The vehicle cooling system 100A further includes an active coolant monitoring system 60 that includes one or more coolant leak sensors 22 that detect leakage of the liquid coolant from the vehicle cooling system and one or more coolant contamination sensors 24 that detect contamination of the of liquid coolant. As illustrated in FIG. 1, each of the coolant contamination sensor 24 and the coolant leak sensor 22 may be provided at the lower coolant hose 12 and/or the expansion tank 20, which are places where leaks may be more likely to occur in the cooling system. Moreover, although FIG. 1 illustrates a single coolant leak sensor 22 and a single coolant contamination sensor 24 at each of the lower coolant hose 12 and the expansion tank 20, in some examples, multiple coolant leak sensors 22 and/or multiple coolant contamination sensors 24 may be disposed at both the lower coolant hose 12 and/or the expansion tank 20.

Figure 2:
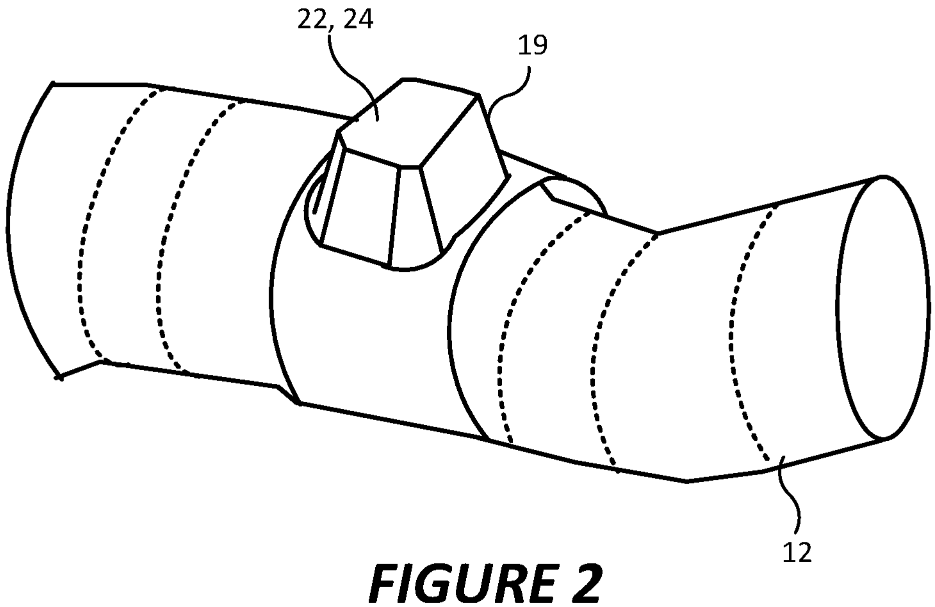
FIG. 2 is an example of a coolant hose clamp with an integrated coolant leak and/or coolant contamination sensor.

As shown in FIG. 1, the coolant contamination sensor 24 and/or the coolant leak sensor 22 may be disposed on, attached to, or integrated into the lower hose coupling 19 and/or the expansion tank 20. Brief reference is made to FIG. 2, which illustrates a lower hose coupling 19 on the lower coolant hose 12 that includes an integrated coolant contamination sensor 24 and/or coolant leak sensor 22.

Figure 3A:
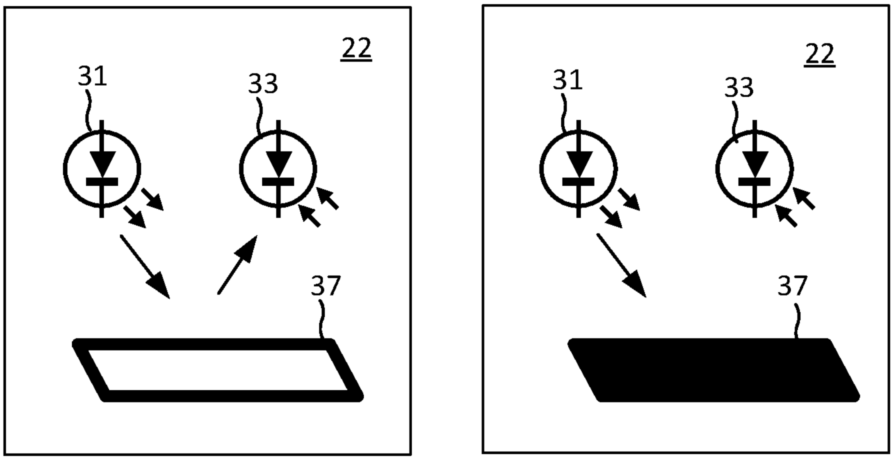
FIG. 3A is an example of an optical coolant leak detector.

Reference is made to FIG. 3A, which illustrates an example of a coolant leak sensor 22 that includes a light emitting diode 31 that transmits an optical signal toward a pH-sensitive surface 37 that changes reflectivity relative to the optical signal in response to detecting a change in pH. A photodiode 33 detects a reflection of the optical signal from the pH-sensitive surface. The photodiode 33 generates a sensor signal in response to detecting the reflection of the optical signal from the pH-sensitive surface 37. If a leak occurs, liquid coolant may contact the pH-sensitive surface 37. Thus, the sensor signal is indicative of a change in pH due to the presence of liquid coolant, which may indicate the occurrence of a coolant leak.

In an example, the coolant contamination sensor 24 may include a pH sensor for detecting a pH level of the liquid coolant. The pH sensor may be a solid-state electronic pH sensor that detects changes in the pH of the liquid coolant electronically. In another example, the pH sensor may be a litmus paper-based pH sensor that detects changes in the pH of the liquid coolant based on a change in color of litmus paper or other pH-sensitive material in the sensor. The pH of liquid coolant in vehicle cooling systems is typically around 10, meaning that the liquid coolant is basic. When the coolant becomes contaminated, it may become more acidic, causing the pH of the liquid coolant to decrease.

By way of example and not limitation, if the pH of the liquid coolant decreases, the effectiveness of the liquid coolant may become impaired, reducing the efficiency of the vehicle cooling system, and the pH sensor may detect this change. Moreover, changes in the pH of the liquid coolant may cause the liquid coolant to become more corrosive, which can damage cooling systems components such as clamps and hoses, and cause leaks.

Additionally, a change in pH of the liquid coolant can indicate the presence of a leak, as the balance of water and glycol in the liquid coolant may change as a result of a leak. Changes in pH can also occur due to other causes, such as excessive temperature cycling. Such changes in the pH of the liquid coolant may also cause the liquid coolant to lose cooling efficiency.

In general, it is desirable for the pH of the liquid coolant to remain within a predetermined acceptable range. An increase or decrease of the pH level of the coolant outside the acceptable range may be detected by the coolant contamination sensor 24 as possibly indicative of a problem with the coolant.

In another example, the coolant contamination sensor 24 may include a color sensor that senses a color of the liquid coolant and generates a signal indicative of the color of the liquid coolant. When the liquid coolant becomes contaminated, the color of the coolant may change. Thus, a change in color of the liquid coolant detected by the color sensor may be indicative of contamination of the liquid coolant. It will be appreciated that coolant color can change for other reasons, such as degradation, which can also reduce the efficiency of the cooling system. Thus, a coolant contamination sensor may also detect other problems with the liquid coolant, such as degradation of the liquid coolant.

Figure 3B:
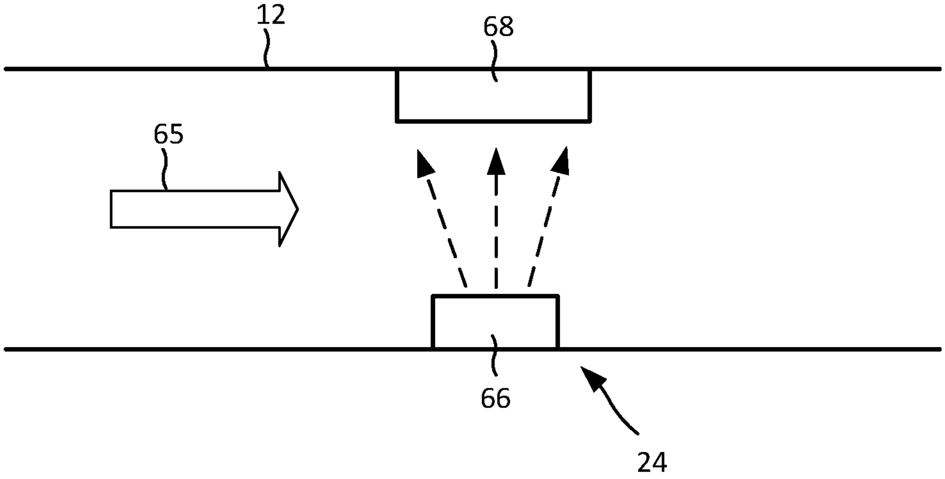
FIG. 3B is an example of an optical coolant contamination detector.

Brief reference is made to FIG. 3B, which illustrates an example of a coolant contamination sensor 24 that includes a light emitter 66 and a color sensor 68 mounted in a coolant hose 12 though which liquid coolant 65 flows. The light emitter 66 may, for example, include one or more light emitting diodes that emit light having different wavelengths, and in particular may include green or yellow light emitting diodes. Light generated by the light emitter 66 is directed though the flow of liquid coolant 65 in the coolant hose 12 toward the color sensor 68.

A normal, uncontaminated coolant may be green or yellow in color and may be at least partially optically transmissive. Thus, for a normal coolant color, the color sensor 68 may detect when the light emitter 66 emits light, which can pass through the liquid coolant 65. When the liquid coolant 65 becomes contaminated, the color of the liquid coolant 65 may change and become less transmissive, which may prevent light generated by the light emitter 66 from passing through the liquid coolant 65. This change in transmissivity of the liquid coolant 65 is detected by the color sensor 68, which generates a sensor signal indicative of possible contamination of the liquid coolant 65 in response to the change in transmissivity.

Referring again to FIG. 1, the active coolant monitoring system 60 further includes an electronic control unit (ECU) 30 that is configured to receive a sensor signal generated by the coolant contamination sensor 24 and/or the coolant leak sensor 22. The sensor signal from the coolant contamination sensor 24 and/or the coolant leak sensor 22 may be fed from the sensor to a transmitter (TX) 13 connected to the coolant contamination sensor 24 and/or the coolant leak sensor 22, and may be transmitted wirelessly by the transmitter 13 to a receiver (RX) 33 connected to the ECU 30. The signal from the coolant contamination sensor 24 may indicate that some contamination of the liquid coolant has occurred, while the signal from the coolant leak sensor 22 may indicate that some liquid coolant has leaked out of the vehicle cooling system 100A. The transmitter 13 may be configured to receive multiple sensor signals from multiple coolant contamination sensors 24 and/or multiple coolant leak sensors 22 and transmit the sensor signals to the ECU 30 for processing.

In some embodiments, the sensor signals output by multiple coolant contamination sensors 24 may be combined by the ECU 30 for more accurate analysis of potential problems with the vehicle cooling system 100A. Fore example, the ECU 30 may combine a sensor signal that indicates a change in pH of the liquid coolant with a sensor signal that indicates a change in color of the liquid coolant to more accurately diagnose a problem with the vehicle cooling system 100A.

Responsive to receiving the sensor signal(s) from the sensor(s) 22, 24, the ECU 30 may generate a notification signal that may be displayed to an operator of the vehicle during vehicle operation. For example, the notification signal may include a leak notification signal 42A or a contamination signal 42B displayed on a dashboard 40 of the vehicle to notify the operator of the condition during vehicle operation.

In an example, the ECU 20 may transmit the notification signal to a remote storage system 50, such as a cloud storage system, for storage and/or analysis. For example, the ECU 30 may transmit the notification signal via a public land mobile radio network (PLMN) interface 45, such as a 4G or 5G network interface, to the remote storage system 50.

Figure 4:
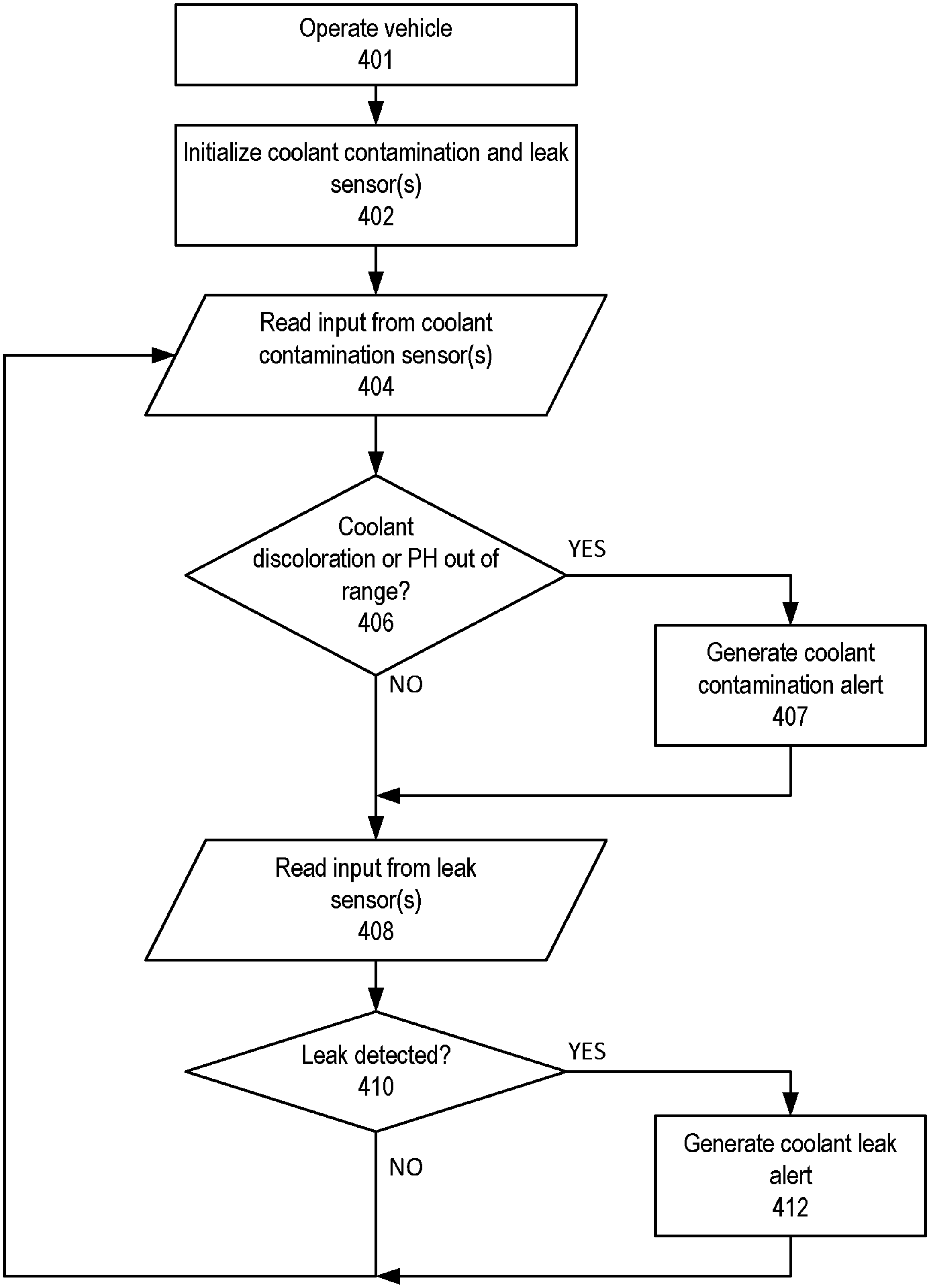
FIG. 4 is a flowchart of operations of an active coolant monitoring system according to one example.

FIG. 4 is a flowchart illustrating systems/methods of an active coolant monitoring system 60 according to an example. In particular, the operations illustrated in FIG. 4 may be performed by a suitably configured ECU 30 of the active coolant monitoring system 60. Referring to FIG. 4, operations begin with the operation of the vehicle at block 401. At block 402, the ECU 30 initializes the coolant contamination sensor(s) 24 and coolant leak sensor(s) 22. As noted above, the active coolant monitoring system 60 may include multiple coolant leak sensors 22 and/or multiple coolant contamination sensors 24 at various locations within the system.

At block 404, the ECU 30 reads a sensor signal from the coolant contamination sensor(s) 24, and at block 406, the ECU 30 determines if the sensor signal indicates contamination of the liquid coolant. For example, when a coolant contamination sensor 24 is a coolant color sensor, the ECU 30 determines if the sensor signal indicates discoloration of the liquid coolant. Likewise, when a coolant contamination sensor 24 is a pH sensor, the ECU 30 determines if the sensor signal indicates that the pH of the liquid coolant has dropped below a threshold, or is otherwise outside of an acceptable range.

If contamination is detected, the ECU 30 generates a coolant contamination alert at block 407, and operations continue.

At block 408, the ECU 30 reads a sensor signal from the coolant leak sensor(s) 22, and at block 410, the ECU 30 determines if the sensor signal indicates leakage of the liquid coolant. If a leak is detected, the ECU 30 generates a coolant leak alert at block 412, and operations return to block 404.

Figure 5:
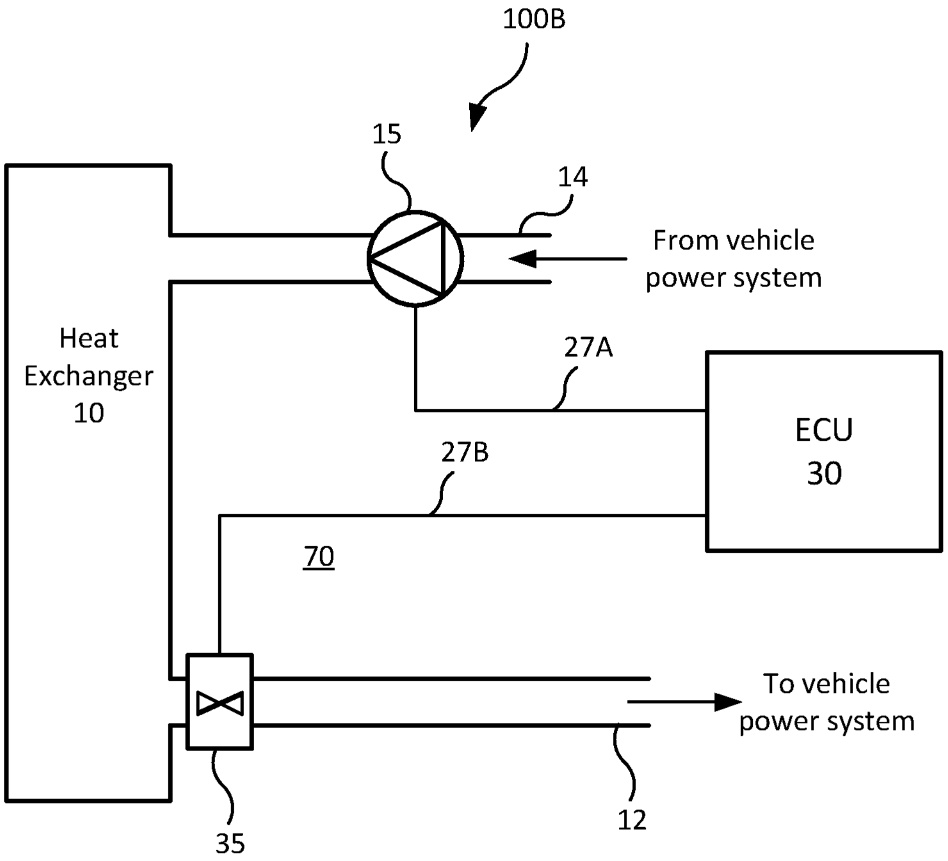
FIG. 5 is a vehicle cooling system including an active coolant leak mitigation system according to one example.

FIG. 5 illustrates an active leak mitigation system 70 in a vehicle cooling system 100B. Due to gravity, hydrostatic pressure within the vehicle cooling system 100B is greatest near the lowest part of the system. Because leaks are more likely to occur under increased pressure, leaks in a vehicle cooling system 100B are more likely to occur in or around the lower coolant hose 12, which is typically under the greatest hydrostatic pressure. This may be a problem particularly when the vehicle is not operating and liquid coolant draining out of the heat exchanger 10 into the lower coolant hose 12 creates static pressure within the lower coolant hose 12 for sustained periods of time.

Accordingly, in some examples, the vehicle cooling system 100B includes an active leak mitigation system 60 including an electronically controlled coolant flow shutoff valve 35 fluidly coupled between the heat exchanger 10 and the lower coolant hose 12. The electronically controlled coolant flow shutoff valve 35 is controlled by the ECU 30 to be closed (i.e., to prevent the flow of liquid coolant) when the pump 15 is turned off, and to be open (i.e., to allow the flow of liquid coolant) when the pump 15 is turned on. For example, as shown in FIG. 5, the ECU 30 may control the operation of the pump 15 using a control signal transmitted via a control line 27A, and may control the state of the coolant flow shutoff valve 35 using a control signal transmitted via a control line 27B such that the coolant flow shutoff valve 35 is open when the pump 15 is on, and the coolant flow shutoff valve 35 is closed when the pump 15 is off.

The coolant flow shutoff valve 35 may be placed at the lowest point of the coolant line where the hydrostatic pressure is highest. Reducing the hydrostatic pressure on the lower portion of the coolant circuit may increase the life of the coolant hose and pipes by reducing the corrosion or reaction of the EPDM material comprised in the coolant hose when it is in contact with the coolant for a long time while the vehicle in a static condition.

Closing the coolant flow shutoff valve 35 may inhibit liquid coolant from collecting in the lower coolant hose 12 when the vehicle is not operating. This reduces hydrostatic pressure in the lower coolant hose 12, which may inhibit or mitigate the formation of leaks.

The vehicle cooling system 100B is shown as an example of a system in which embodiments may be employed, but it will be appreciated that the vehicle cooling system 100B can have many different configurations. For example, the coolant flow shutoff valve 35 and/or the pump 15 may be located at different locations within the vehicle cooling system 100B. Embodiments described herein can be advantageously employed in many different types of vehicle cooling systems.

Figure 6:
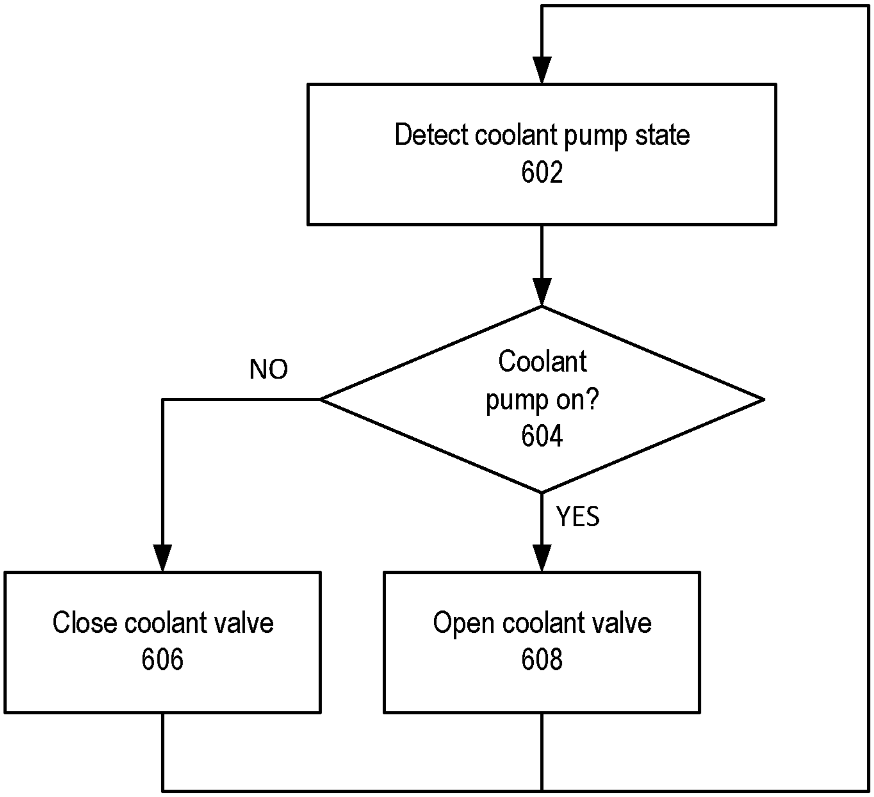
FIG. 6 is a flowchart of operations of an active coolant leak mitigation system according to one example.

FIG. 6 is a flowchart illustrating systems/methods of a active leak mitigation system 70 according to an example. In particular, the operations illustrated in FIG. 6 may be performed by a suitably configured ECU 30 of the active leak mitigation system 70. Referring to FIG. 6, operations begin at block 602 where the active leak mitigation system 70 detects an operational state of the coolant pump 15. At block 604, the systems/methods determine if the coolant pump is on. If the pump is on, the systems/methods open the coolant valve at block 608. If the pump is off, the systems/methods close the coolant valve at block 606.

Figure 7:
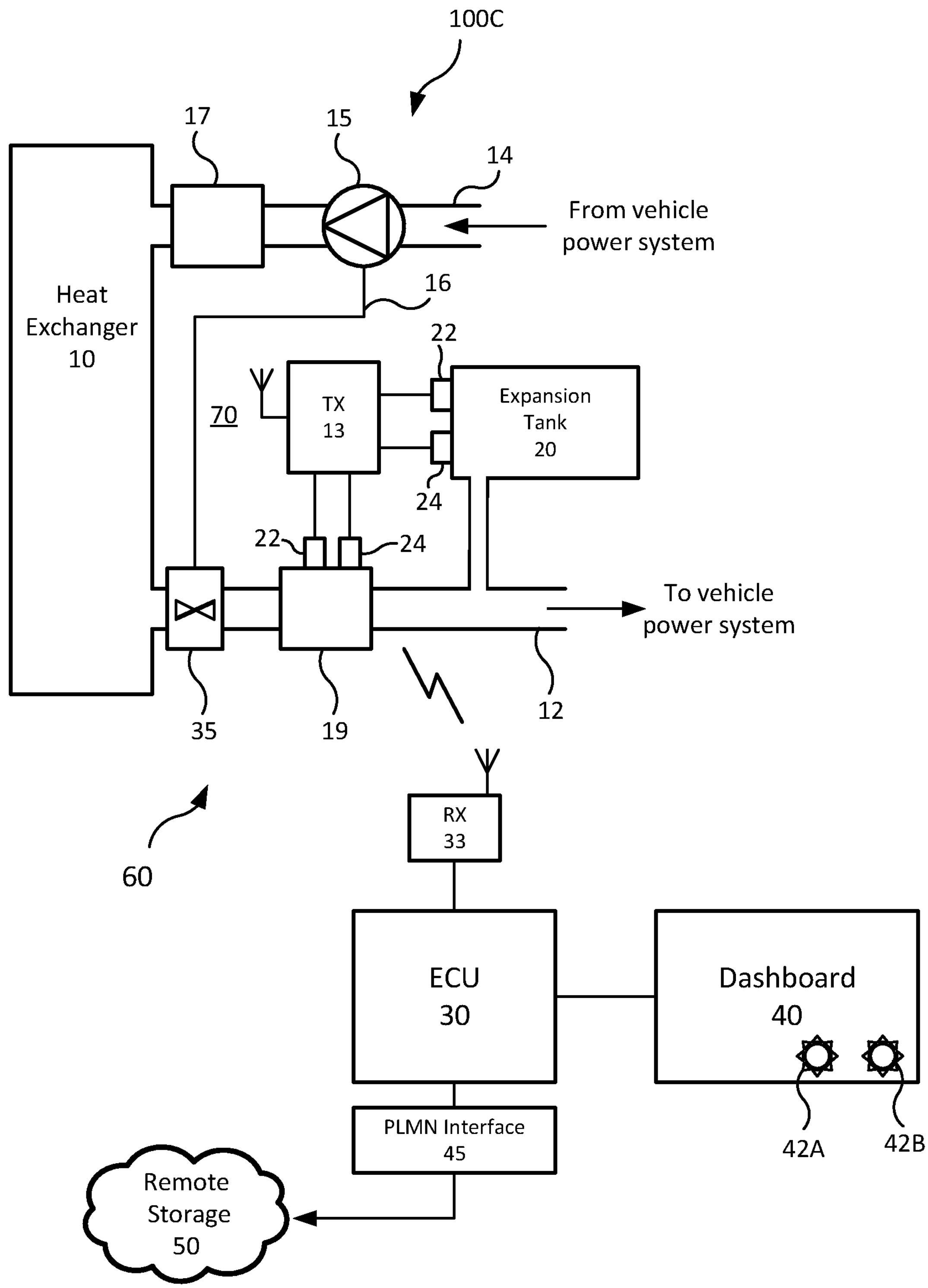
FIG. 7 is a vehicle cooling system including both an active coolant leak mitigation system and an active coolant monitoring system according to one example.

FIG. 7 illustrates an example of a vehicle cooling system 100C that includes both an active coolant monitoring system 60 and an active leak mitigation system 70. In the example shown in FIG. 7, a control line 16 is coupled between the pump 15 and the coolant flow shutoff valve 35. The control line 16 carries a signal indicative of the operational state of the pump 15 and controls the coolant flow shutoff valve 35 to open when the pump 15 is on and to close when the pump 15 is off.

The vehicle cooling system 100C is shown as an example of a system in which embodiments may be employed, but it will be appreciated that the vehicle cooling system 100C can have many different configurations, and that embodiments described herein can be advantageously employed in many different types of vehicle cooling systems.

The complexity of vehicle coolant systems is constantly increasing as new power systems are being adopted. For example, coolant system complexity is higher in electric and fuel cell electric vehicles (FCEV), and the need for effective cooling is very important in such vehicles. The number of pipe joints in electric and FCEV system is large (e.g. 3 to 4 times over conventional vehicles), and hence there is an increasing need for active coolant leak detection systems to ensure that leaks are detected and corrected quickly.

As noted above, existing systems for detecting coolant leaks are passive in nature, and can only be employed when the vehicle is stopped for testing or inspection. Passive systems are not suitable for detecting coolant leaks while the vehicle is running. In contrast, the active coolant monitoring systems and methods described herein can monitor a system for leaks and/or contamination while the vehicle is operating. Some examples may also help in detecting the exact location of a leak, and may notify the vehicle operator of a potential leak. This may reduce engine overheating and help to ensure that the thermal efficiency of the engine is maintained at all times.

Data obtained from an active coolant monitoring system may be stored in a remote location, such as a cloud storage system, where it can be tabulated and analyzed. Such data may be helpful in predictive maintenance of the vehicle and thereby reduce vehicle downtime by reducing the inspection time needed during maintenance.

Figure 8:
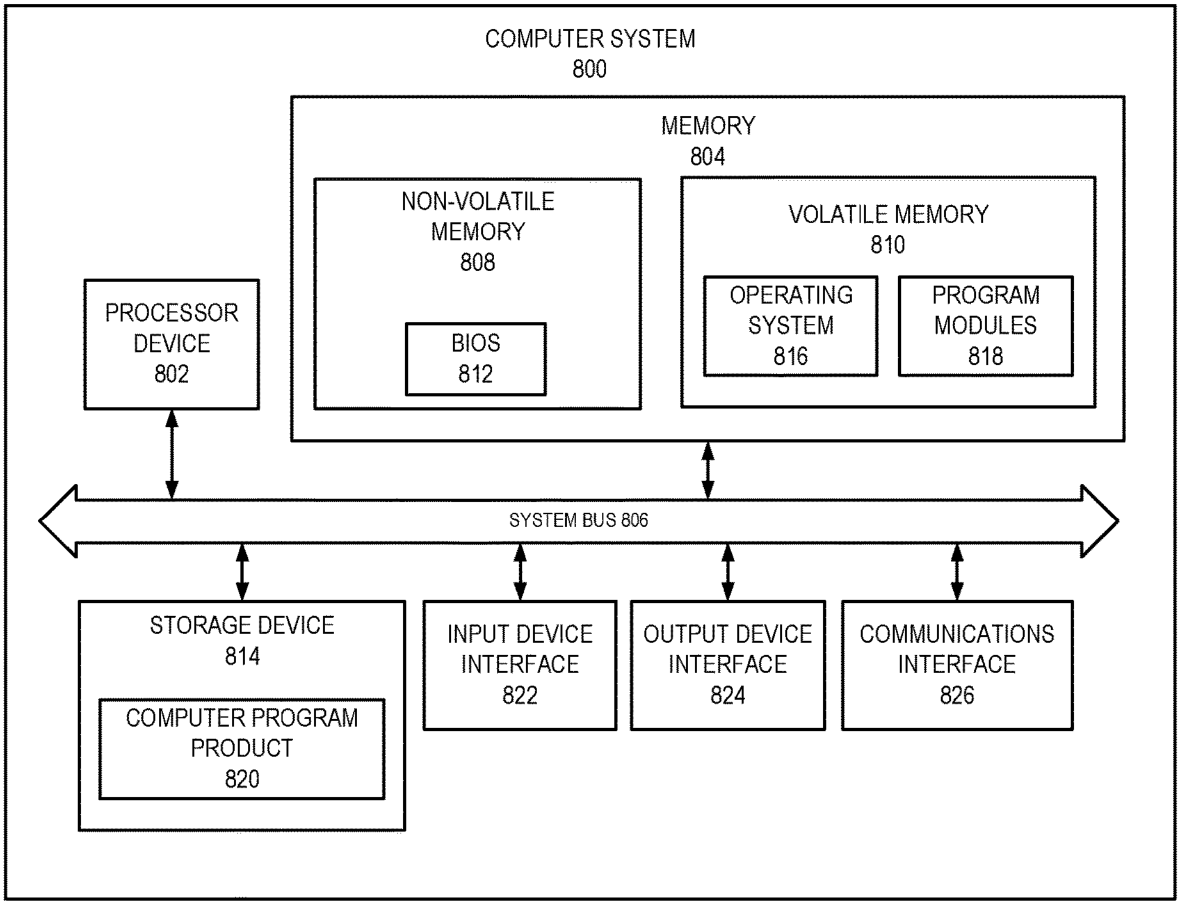
FIG. 8 is a schematic diagram of a computer system for implementing an electronic control unit of examples disclosed herein, according to one example.

FIG. 8 is a schematic diagram of a computer system 800 for implementing an ECU 30 according to examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein.

The computer system 800 may comprise any computing or electronic device capable of including firmware, hardware, and/or executing software instructions to implement the functionality described herein. The computer system 800 includes a processor device 802 (may also be referred to as a control unit), a memory 804, and a system bus 806. The system bus 806 provides an interface for system components including, but not limited to, the memory 804 and the processor device 802. The processor device 802 may include any number of hardware components for conducting data or signal processing or for executing computer code stored in memory 804. The processor device 802 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processor device 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with a processor device 802. A basic input/output system (BIOS) 812 may be stored in the non-volatile memory 808 and can include the basic routines that help to transfer information between elements within the computing device 800.

The computing device 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be stored in the storage device 814 and in the volatile memory 810, including an operating system 816 and one or more program modules 818, which may implement the functionality described herein in whole or in part. All or a portion of the examples disclosed herein may be implemented as a computer program product 820 stored on a transitory or non-transitory computer-usable or computer-readable storage medium (i.e., single medium or multiple media), such as the storage device 814, which includes complex programming instructions, such as complex computer-readable program code, to cause the processor device 802 to carry out the steps described herein. Thus, the computer-readable program code can comprise software instructions for implementing the functionality of the examples described herein when executed by the processor device 802. The processor device 802 may serve as a controller, or control system, for the computing device 800 that is to implement the functionality described herein.

The computer system 800 also may include an input device interface 822 (e.g., input device interface and/or output device interface). The input device interface 822 may be configured to receive input and selections to be communicated to the computer system 800 when executing instructions, such as from a keyboard, mouse, touch-sensitive surface, etc. Such input devices may be connected to the processor device 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computing device 800 may also include a communications interface 826 suitable for communicating with a network as appropriate or desired.

The operational steps described in any of the exemplary embodiments herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

It is to be understood that the concepts described herein are not limited to the embodiments described above and illustrated in the drawings; rather, the skilled person will recognize that many changes and modifications may be made within the scope of the present disclosure and appended claims.

The invention claimed is:

1. A vehicle cooling system comprising:

a heat exchanger;

upper and lower coolant hoses extending between the heat exchanger and a vehicle power system for carrying liquid coolant to and from the vehicle power system;

an expansion tank fluidly coupled to the lower coolant hose; and an active coolant monitoring system comprising a coolant leak sensor that detects leakage of the liquid coolant from the vehicle cooling system and a coolant contamination sensor that detects contamination of the liquid coolant, wherein each of the coolant contamination sensor and the coolant leak sensor is disposed at the lower coolant hose and/or the expansion tank.

2. The vehicle cooling system of claim 1, further comprising:

an electronic control unit, ECU, configured to receive a sensor signal generated by the coolant contamination sensor and/or the coolant leak sensor and to generate a notification signal in response to the sensor signal.

3. The vehicle cooling system of claim 2, wherein the notification signal comprises a dashboard signal on a dashboard of a vehicle in which the vehicle cooling system is provided.

4. The vehicle cooling system of claim 2, wherein the ECU transmits the notification signal to a remote storage system.

5. The vehicle cooling system of claim 2, further comprising:

a wireless transmitter configured to receive the sensor signal from the coolant color sensor and/or the coolant leak sensor and to transmit the sensor signal to the ECU.

6. The vehicle cooling system of claim 1, further comprising a hose clamp on the lower coolant hose, wherein the coolant color sensor and/or the coolant leak sensor is integrated into the hose clamp.

7. The vehicle cooling system of claim 1, wherein the coolant contamination sensor comprises a pH sensor for detecting a pH level of the liquid coolant.

8. The vehicle cooling system of claim 1, wherein the pH sensor comprises a solid state electronic pH sensor.

9. The vehicle cooling system of claim 1, wherein the coolant leak sensor comprises a light emitting diode that generates an optical signal toward a pH-sensitive surface that changes reflectivity relative to the optical signal in response to detecting a change in pH, and a photodiode that is configured to detect a reflection of the optical signal from the pH-sensitive surface and to generate a sensor signal in response to detecting the reflection of the optical signal from the pH-sensitive surface.

10. The vehicle cooling system of claim 1, wherein the coolant contamination sensor comprises a color sensor that senses a color of the liquid coolant and generates a signal indicative of the color of the liquid coolant.

11. The vehicle cooling system of claim 1, further comprising:

a coolant pump attached to the upper coolant hose; and an electronically controllable coolant flow shutoff valve in series with the lower coolant hose adjacent a lower coolant outlet of the heat exchanger, wherein the electronically controllable coolant flow shutoff valve is configured to be closed when the coolant pump is off and open when the coolant pump is on.

12. The vehicle cooling system of claim 11, further comprising an electrical control line between the coolant pump and the electronically controllable coolant flow shutoff valve and configured to carry a control signal from the coolant pump to the electronically controllable coolant flow shutoff valve indicative of an operational state of the coolant pump.

13. The vehicle cooling system of claim 11, wherein the electronically controllable coolant flow shutoff valve is configured to inhibit liquid coolant from pressurizing the lower coolant hose when the pump is off.

14. A vehicle cooling system comprising:

a heat exchanger;

upper and lower coolant hoses extending between the heat exchanger and a vehicle power system for carrying liquid coolant to and from the vehicle power system;

a coolant pump attached to the upper coolant hose; and an electronically controllable coolant flow shutoff valve in series with the lower coolant hose adjacent a lower coolant outlet of the heat exchanger, wherein the electronically controllable coolant flow shutoff valve is configured to be closed when the coolant pump is off and open when the coolant pump is on.

15. The vehicle cooling system of claim 14, further comprising an electrical control line between the coolant pump and the electronically controllable coolant flow shutoff valve and configured to carry a control signal from the coolant pump to the electronically controllable coolant flow shutoff valve indicative of an operational state of the coolant pump.

16. The vehicle cooling system of claim 14, wherein the electronically controllable coolant flow shutoff valve is configured to inhibit liquid coolant from collecting in the lower coolant hose when the pump is off.

17. The vehicle cooling system of claim 14, further comprising an active coolant monitoring system comprising a coolant leak sensor that detects leakage of the liquid coolant from the vehicle cooling system and a coolant contamination sensor that detects contamination of the liquid coolant, wherein each of the coolant color sensor and the coolant leak sensor is disposed at the lower coolant hose and/or the expansion tank.

18. The vehicle cooling system of claim 14, further comprising:

an electronic control unit, ECU, configured to receive a sensor signal generated by the coolant contamination sensor and/or the coolant leak sensor and to generate a notification signal in response to the sensor signal.

19. The vehicle cooling system of claim 18, further comprising:

a wireless transmitter configured to receive the sensor signal from the coolant contamination sensor and/or the coolant leak sensor and to transmit the sensor signal to the ECU.

20. A method of operating a vehicle cooling system for a vehicle, the vehicle cooling system including:

a heat exchanger;

upper and lower coolant hoses extending between the heat exchanger and a vehicle power system for carrying liquid coolant to and from the vehicle power system;

an expansion tank fluidly coupled to the lower coolant hose; and an active coolant monitoring system comprising a coolant leak sensor that detects leakage of the liquid coolant from the vehicle cooling system and a coolant contamination sensor that detects contamination of the liquid coolant, wherein the coolant leak sensor and/or the coolant contamination sensor is disposed at the lower coolant hose or the expansion tank, the method comprising:

during operation of the vehicle, determining whether the liquid coolant is contaminated based on a first signal from the coolant contamination sensor, and generating a first alert in response to detecting contamination of the liquid coolant; and determining whether there is a leak in vehicle cooling system based on a second sensor signal from the coolant leak sensor, and generating a second alert in response to detecting the leak in the vehicle cooling system.

* * * * *